United States Patent [19]

Miyawaki et al.

[11] Patent Number: 4,675,818

[45] Date of Patent: Jun. 23, 1987

[54] SYSTEM FOR CONTROLLING AN ELECTROMAGNETIC CLUTCH FOR AN AUTOMOTIVE ENGINE

[75] Inventors: Motohisa Miyawaki, Chofu; Ryuzo Sakakiyama, Tokyo, both of Japan

[73] Assignees: Fuji Jukogyo Kabushiki Kaisha, Tokyo, Japan; Van Doorne's Transmissie B.V., Tilburg, Netherlands

[21] Appl. No.: 695,979

[22] Filed: Jan. 29, 1985

[30] Foreign Application Priority Data

Jan. 31, 1984 [JP] Japan .................................. 59-15420

[51] Int. Cl.⁴ ...................... B60K 41/22; F16D 27/16
[52] U.S. Cl. ................... 364/424.1; 192/0.032; 192/0.052; 192/0.076
[58] Field of Search .................... 364/424.1; 192/0.03, 192/0.032, 0.033, 0.052, 0.075, 0.076

[56] References Cited

U.S. PATENT DOCUMENTS

| | | | |
|---|---|---|---|
| 4,461,374 | 7/1984 | Umezawa | 192/0.052 |
| 4,473,143 | 9/1984 | Windsor | 192/0.052 |
| 4,499,450 | 2/1985 | Makita | 364/424.1 |

FOREIGN PATENT DOCUMENTS 57-15024  1/1982  Japan .

Primary Examiner—Felix D. Gruber
Attorney, Agent, or Firm—Martin A. Farber

[57] ABSTRACT

A system for controlling an electromagnetic clutch has a reference valve generator which produces clutch-engaging and clutch-disengaging engine speed signals in a low vehicle speed range. Engine speed is compared with the engine speed signals by a comparator. The clutch is engaged at a higher engine speed than a clutch disengaging speed and disengaged at a lower engine speed than a clutch engaging speed in accordance with the result of the comparison.

6 Claims, 5 Drawing Figures

4,675,818

SYSTEM FOR CONTROLLING AN ELECTROMAGNETIC CLUTCH FOR AN AUTOMOTIVE ENGINE

BACKGROUND OF THE INVENTION

The present invention relates to a system for controlling an electromagnetic clutch disposed between the crankshaft of an engine and an infinitely variable transmission of a motor vehicle.

A clutch torque control system for the starting of a vehicle is, for example, disclosed in Japanese Patent Laid Open 57-15024. In the system, the clutch current flowing in a coil of an electromagnetic clutch exponentially increases with respect to an increase of the speed of an engine for starting the vehicle. When vehicle speed exceeds a predetermined speed (for example 20 km/h), lock-up current flows through the coil, so that the clutch is entirely engaged. At deceleration of the vehicle, when the accelerator pedal of the vehicle is released and the vehicle speed decreases below the predetermined speed, the clutch current is cut off to disengage the clutch in response to operations of an accelerator switch and a vehicle speed switch.

In such a control system, if the accelerator pedal of the vehicle is depressed to close the accelerator switch at a low vehicle speed below the predetermined speed, the clutch current dependent on the engine speed passes through the coil, so that the clutch is partially engaged.

On the other hand, an infinitely variable belt-drive transmission combined with such an electromagnetic clutch is so designed as to increase the reduction ratio at a low vehicle speed below the predetermined speed. If the vehicle is accelerated and decelerated at the low vehicle speed where the transmission ratio is at large reduction ratios, the vehicle is greatly accelerated and decelerated due to the large reduction ratios. Such a great variation of the vehicle speed extremely decreases the driveability of the vehicle.

SUMMARY OF THE INVENTION

The object of the present invention is to provide a system for controlling an electromagnetic clutch associated with an infinitely variable belt-drive transmission which can prevent a decrease of the drivebility of a vehicle by disengaging the clutch when the speed of an engine decreases below a predetermined low speed in a low vehicle speed range even if an accelerator pedal is depressed.

According to the present invention, there is provided a system for controlling an electromagnetic clutch for transmitting the power of an engine to the driving wheels of a vehicle through an infinitley variable transmission comprising: an engine speed sensor for producing an engine speed signal in proportion to the engine speed; an accelerator pedal switch adapted to be operated to produce an accelerator pedal signal when an accelerator pedal of said vehicle is depressed; means for setting a clutch-engaging engine speed and a clutch-disengaging engine speed, said clutch-engaging and clutch-disengaging engine speeds being in a low engine speed range and the clutch-engaging engine speed being set to a speed higher than the clutch-disengaging engine speed; comparing means for comparing the engine speed with said clutch-engaging and disengaging-signals for producing a clutch-engaging signal and clutch-disengaging signal dependent on the comparison; and gate means responsive to said accelerator pedal signal and to said clutch-disengaging signal for disengaging said clutch and respectively to said clutch-engaging signal for engaging said clutch.

The other objects and features of this invention will become understood from the following description with reference to the accompanying drawings.

DETAILED DESCRIPTION OF THE PREFERRED EMBODIMENTS

Figure 1A:
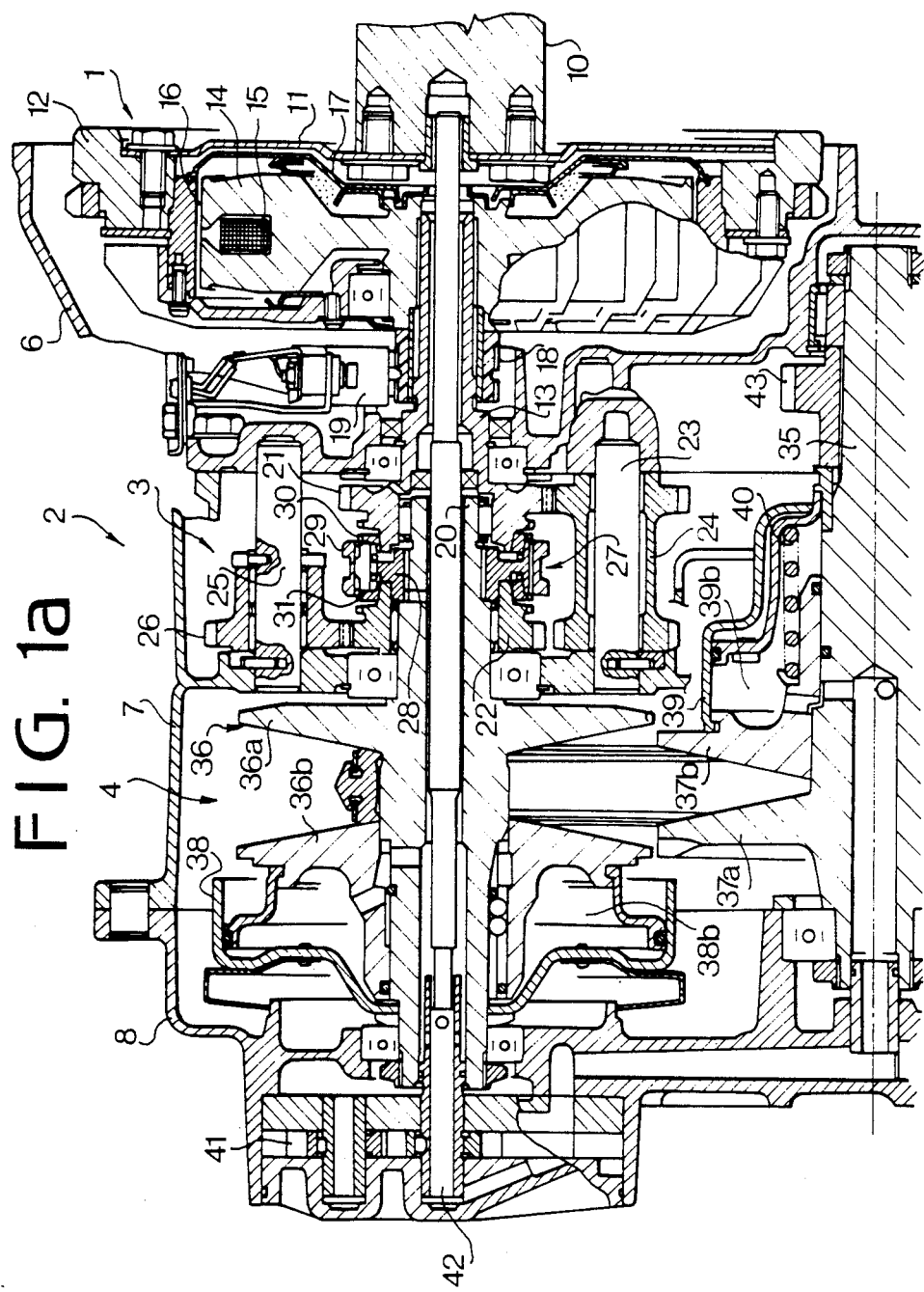
FIG. 1a and 1b are sectional views of an infinitely variable belt-drive transmission to which the present invention is applied.
Figure 1B:
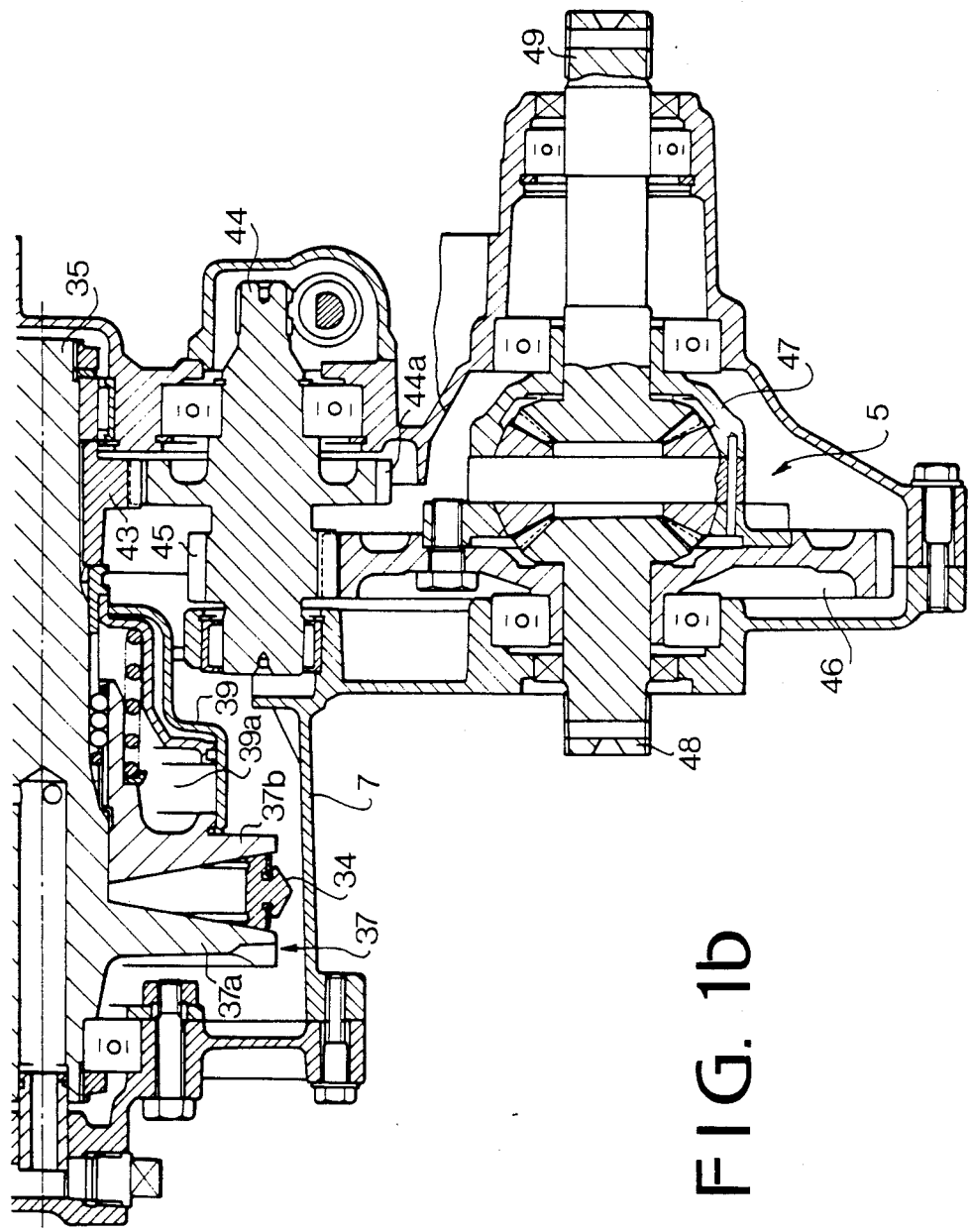

Referring to FIG. 1, an infinitely variable belt-drive automatic transmission for a vehicle, to which the present invention is applied, comprises an electromagnetic powder clutch 1, an infinitely variable belt-drive transmission 2, a selector device 3, pulleys and belt device 4, final reduction device 5, and a pressure oil control circuit (not shown). The electromagnetic powder clutch 1 is provided in a housing 6, and the selector device 3, pulleys and belt device 4 and final reduction device 5 are provided in a main housing 7 and a side housing 8. A crankshaft 10 of an engine (not shown) is connected to an annular drive member 12 through a drive plate 11 of the electromagnetic powder clutch 1. The electromagnetic powder clutch comprises a driven member 14, and a magnetizing coil 15 provided in the driven member 14. The driven member 14 has its outer periphery spaced from the inner periphery of the drive member 12 by a gap 16, and a powder chamber 17 is defined between the drive member 12 and driven member 14. The powder chamber 17 is filled with magnetic powder material. The driven member 14 is secured to an input shaft 13 of the belt-drive transmission. A holder secured to the driven member 14 carries slip rings 18 which are electrically connected to the coil 15. The coil 15 is supplied through brushes 19 and slip rings 18 with current from a control circuit for the electromagnetic powder clutch.

When the magnetizing coil 15 is excited by clutch current, the driven member 14 is magnetized to produce a magnetic flux passing through the drive member 12. The magnetic powder is aggregated in the gap 16 by the magnetic flux and the driven member 14 is engaged with the drive member 12 by the powder. On the other hand, when the clutch current is cut off, the drive and driven members 12 and 14 are disengaged from one another.

In the belt-drive transmission 2, the selector device 3 is provided between the input shaft 13 and a main shaft 20. The main shaft 20 is cylindrical and is disposed coaxially with the input shaft 13. The selector device 3 comprises a drive gear 21 integral with the input shaft 13, a reverse driven gear 22 rotatably mounted on the main shaft 20, and a synchronizer 27 mounted on the main shaft 20. The drive gear 21 meshes with one gear of a counter gear 24 rotatably mounted on a shaft 23. Another gear of the counter gear 24 engages with an idler gear 26 rotatably mounted on a shaft 25, which in turn engages with the driven gear 22.

The synchronizer 27 comprises a hub 28 secured to the main shaft 20, a synchronizer sleeve 29 slidably engaged with the hub 28 with splines, and synchronizer rings 30 and 31. The synchronizer sleeve 29 is adapted to engage with splines of the drive gear 21 or with splines of the driven gear 22 through rings 30 or 31.

At a neutral position (N range) of a selector lever (not shown), the sleeve 29 does not engage either gear, so that the main shaft 20 is disconnected from the input shaft 13. When the sleeve 29 is engaged with the gear 21, the input shaft 13 is connected to the main shaft 20 through the gear 21 and the synchronizer 27 to provide a driving position (D range).

When the sleeve 29 is engaged with the gear 22, the input shaft 13 is connected to the main shaft 20 through gears 21, 24, 26 and 22 to provide a reverse driving position (R range).

The main shaft 20 has an axial passage in which there is mounted an oil pump driving shaft 42 connected to the crankshaft 10. An outut shaft 35 is provided in parallel with the main shaft 20. A drive pulley 36 and a driven pulley 37 are mounted on the shafts 20 and 35. A fixed conical disc 36a of the drive pulley 36 is integral with the main shaft 20 and an axially movable conical disc 36b is axially slidably mounted on the main shaft 20. The movable conical disc 36b also slides in a cylinder secured to the main shaft 20 to form a servo device 38. A chamber of the servo device 38 communicates with a gear pump 41 through the pressure oil control circuit. The gear pump 41 is driven by the shaft 42.

A fixed conical disc 37a of the driven pulley 37 is formed on the output shaft 35 opposite the movable disc 36b and a movable conical disc 37b is slidably mounted on the shaft 35 opposite the disc 36a. The movable conical disc 37b has a cylindrical portion in which a piston portion of the output shaft 35 is slidably engaged to form a servo device 39. A chamber of the servo device 39 is communicated with the oil pump 41 through the pressure oil control circuit. A spring 40 is provided to urge the movable conical disc 37b toward fixed conical disc 37a. A drive belt 34 engages with the drive pulley 36 and the driven pulley 37.

Secured to the output shaft 35 is a drive gear 43 which engages with an intermediate reduction gear 44a on an intermediate shaft 44. An intermediate gear 45 on the shaft 44 engages with a final gear 46. Rotation of the final gear 46 is transmitted to axles 48 and 49 of driving wheels of the vehicle through a differential 47.

The pressure oil control circuit is responsive to vehicle speed, engine speed and throttle valve position for controlling the pressure oil supply to the servo devices 38 and 39 thereby to move the discs 36b and 37b. Thus, the transmission ratio is infinitely changed.

Figure 2:
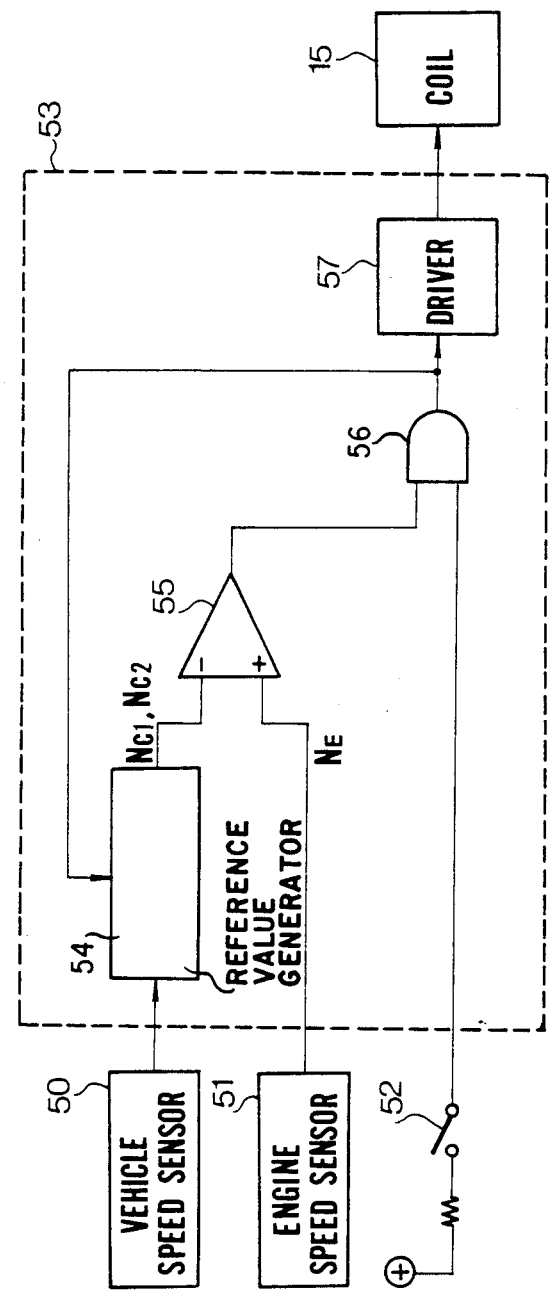
FIG. 2 is a block diagram showing an embodiment of the present invention.

Referring to FIG. 2 showing a control system for the electromagnetic powder clutch, the system comprises a vehicle speed sensor 50 for producing a pulse train the frequency of which varies in proportion to the vehicle speed, an engine speed sensor 51 produces a signal corresponding to ignition pulses of the engine, and an accelerator pedal switch 52 which is closed to produce an accelerator pedal signal when an accelerator pedal of the vehicle is depressed. A control unit 53 of the system has a reference value generator 54 applied with output pulses of the vehicle speed sensor 50, a comparator 55 for comparing the outputs of the reference value generator 54 and the engine speed sensor with each other, and an AND gate 56 applied with the outputs of the comparator 55 and accelerator pedal switch 52. The output of the AND gate 56 is applied to the reference value generator 54 and to the magnetizing coil 15 through a driver 57.

Figure 3:
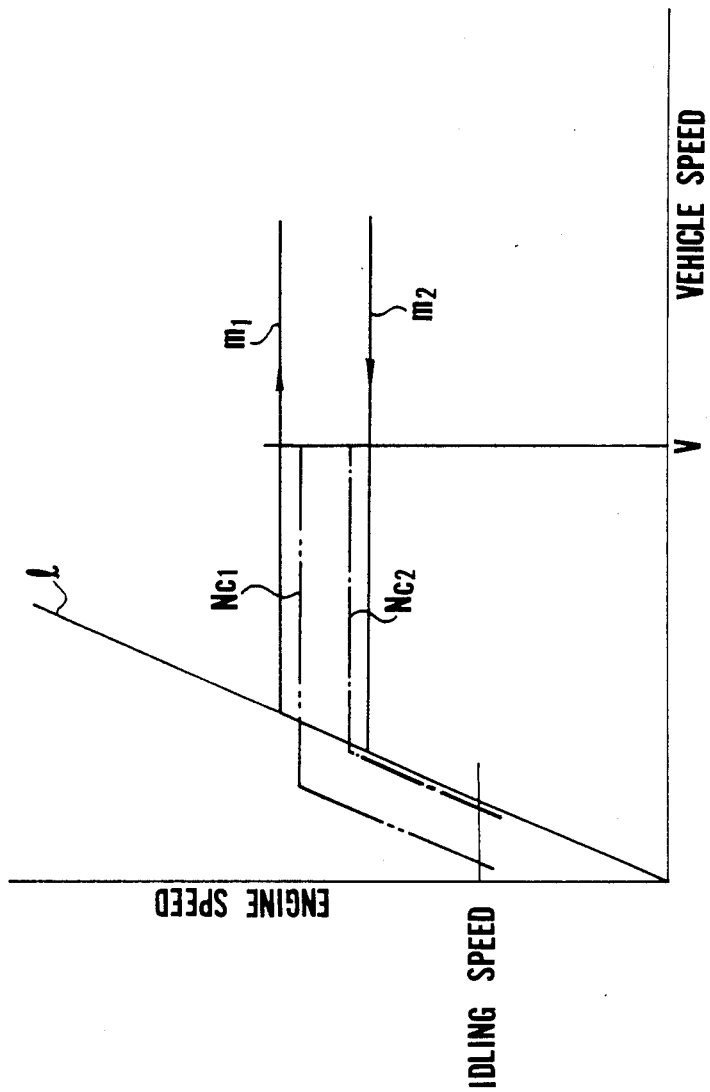
FIG. 3 shows the variation of engine speed with respect to vehicle speed below a predetermined speed.

Referring to FIG. 3, a line $m_1$ is the lowest upshift line, a line $m_2$ is the lowest downshift line of the infinitely belt-drive transmission, and line l is the highest transmission ratio line. The infinitely variable transmission is so designed as to automatically decrease the transmission ratio when the engine speed reaches a speed which is determined by driving conditions. Accordingly, the vehicle speed decreases with a decrease of the transmission ratio without increasing the engine speed. Similarly, the system is designed so that when the engine speed decreases to a predetermined speed, the transmission ratio increases. Accordingly, at a heavy load, the vehicle speed increases along the lowest upshift line $m_1$ and decreases along the lowest downshift line $m_2$.

In accordance with the present invention, a clutch-disengaging engine speed $N_{c2}$ which is higher than the engine speed corresponding to the lowest downshift line $m_2$ and a clutch-engaging engine speed $N_{c1}$ which is lower than the engine speed corresponding to the lowest upshift line $m_1$ but higher than the clutch-disengaging engine speed $N_{c2}$ are used as reference values for controlling the clutch operation.

Describing the operation of the system with reference to FIGS. 2 and 3, a normal acceleration state at a vehicle speed below a predetermined vehicle speed V, the reference value generator 54 produces reference value $N_{c1}$. When the engine speed $N_E$ is higher than the reference value $N_{c1}$, the comparator 55 produces a high level output. Accordingly, the AND gate 56 produces a high level output which is applied to the driver 57 thereby to pass the clutch current through the magnetizing coil 15. The clutch current increases with an increase of the engine speed to perform a smooth acceleration of the vehicle. On the other hand, the reference value $N_{c1}$ is changed to the reference value $N_{c2}$ by the high level output of the AND gate 56. When the accelerator pedal switch 52 is opened by releasing of the accelerator pedal, the output of AND gate 56 goes to a low level, so that the clutch current is cut off to disengage the clutch.

During deceleration of the vehicle, if the switch 52 is not opened (which occurs when a foot of a driver is not sufficiently removed from the accelerator pedal) and the output of AND gate 56 is at high level, the reference value generator 54 produces the reference value $N_{c2}$ as described above. When the engine speed $N_E$ decreases below the reference value $N_{c2}$, the output of the comparator 55 becomes low. Thus, the output of the AND gate 56 goes to a low level, so that the clutch is disengaged. At the same time, the low level output of the AND gate 56 is applied to the reference value generator 54, so that the output of the computer changes to the reference value $N_{c1}$. Under such a condition, even if the accelerator pedal is depressed, the clutch is not engaged, as long as the engine speed $N_E$ is lower than the reference value $N_{c1}$ which is higher than reference value $N_{c2}$ as a clutch-disengaging reference value. When the engine speed becomes higher than the reference value $n_{c1}$, the outputs of the comparator 55 and AND gate 56 change to high levels. Thus, the clutch is engaged.

Figure 4:
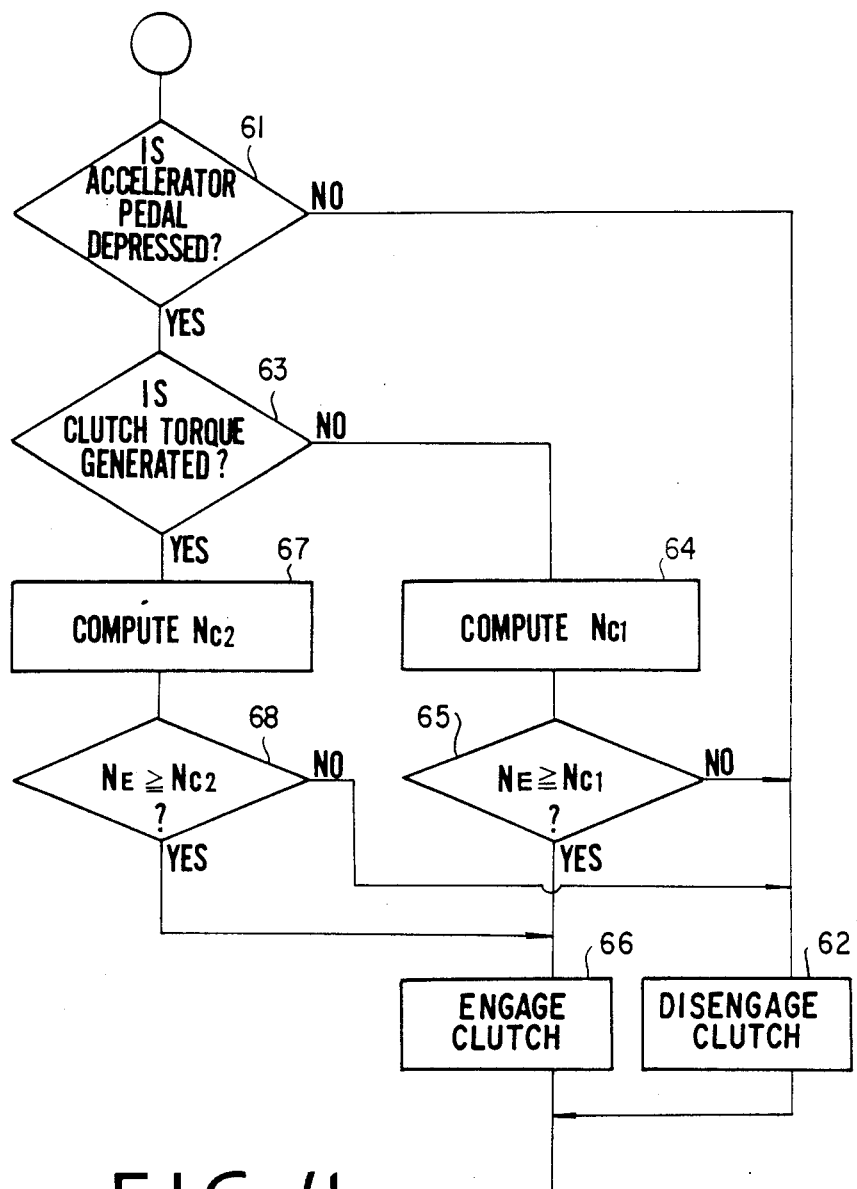
FIG. 4 shows a flowchart in another embodiment of the present invention.

FIG. 4 shows an operation of another embodiment of the present invention, which employs a microcomputer. In the system of FIG. 4, clutch torque is detected in addition to the accelerator pedal switch in order to insure the operation. Referring to the embodiment of FIG. 4, step 61 determines if the accelerator pedal is depressed. If not the clutch is disengaged by step 62. If yes, step determines if clutch torque is generated. If not $N_{c1}$ is computed in step 64 and then step 65 determines if engine speed $N_E$ is equal or greater that $N_{c1}$. If not, the clutch is disengaged by step 62. If yes, the clutch is engaged by going to step 66. When clutch torque is generated, $N_{c2}$ is computed at step 67, whereupon step 68 determines if $N_E$ is equal or greater that $N_{c2}$. If not, the clutch is disengaged by step 62. If yes, the clutch is engaged by going to step 68.

From the foregoing, it will be understood that, in the system of the present invention, the clutch is not engaged at a low vehicle speed, unless the engine speed exceeds a predetermined clutch-engaging speed $N_{c1}$, and that the clutch is disengaged when the engine speed decreases below a predetermined clutch-disengaging engine speed $N_{c2}$, even if the accelerator pedal is depressed. Accordingly, driveability of the vehicle at a low vehicle speed can be improved. Since the clutch-engaging speed is set to a value higher than the clutch-disengaging speed, hunting of the system can be prevented.

What is claimed is:

1. A system for controlling an electromagnetic clutch for transmitting power of an engine to driving wheels of a vehicle through an infinitely variable transmission comprising
    an engine speed sensor for producing an actual engine speed signal corresponding to the engine speed;
    an accelerator pedal switch for producing an accelerator pedal signal when an accelerator pedal of said vehicle is depressed;
    means for setting a clutch-engaging engine speed signal and a clutch-disengaging engine speed signal in a low vehicle speed range below a predetermined low vehicle speed;
    said clutch-engaging and clutch-disengaging engine speed signals being in a low engine speed range and the clutch-engaging engine speed signal being set to correspond to an engine speed higher than an engine speed to which the clutch-disengaging engine speed signal corresponds;
    comparing means for comparing the actual engine speed signal with said clutch-engaging and disengaging engine speed signals respectively for producing a clutch-engaging signal and a clutch-disengaging signal respectively dependent on the comparing; and
    gate means responsive to said accelerator pedal signal and to said clutch-disengaging signal for disengaging said clutch and respectively to said clutch-engaging signal for engaging said clutch.

2. The system for controlling an electromagnetic clutch according to claim 1 wherein
    said means for setting is a reference value generator.

3. The system for controlling an electromagnetic clutch according to claim 1 wherein said gate means is an AND gate.

4. A method for controlling an electromagnetic clutch for transmitting power of an engine to driving wheels of a vehicle through an infinitely variable transmission comprising the steps of:
    setting a clutch-engaging engine speed signal and a clutch-disengaging engine speed signal in a low vehicle speed range below a predetermined low vehicle speed, said clutch-engaging and clutch-disengaging engine speed signals corresponding to a low engine speed range and the clutch-engaging engine speed signal being set to correspond to an engine speed higher than an engine speed to which the clutch-disengaging engine speed signal corresponds;
    comparing actual engine speed with said clutch-engaging and disengaging engine speed signal respectively for producing a clutch-engaging signal and a clutch-disengaging signal respectively dependent on the comparing; and
    engaging said clutch when the actual engine speed is greater than said clutch-engaging signal, and respectively, disengaging said clutch when the actual engine speed is lower than said clutch-disengaging signal.

5. The method according to claim 4, further wherein said clutch-engaging signal is set when said clutch is disengaged, and
    said clutch-disengaging signal is set when said clutch is engaging.

6. The method according to claim 4, further comprising the step of
    disengaging said clutch when an accelerator pedal of the vehicle is released.

* * * * *